United States Patent [19]

Satomi et al.

[11] Patent Number: 5,483,519
[45] Date of Patent: Jan. 9, 1996

[54] METHOD AND APPARATUS FOR LINE SWITCHING

[75] Inventors: Shigeki Satomi, Tokyo; Mitsunobu Nagao, Yokohama; Naoki Ono, Kawasaki, all of Japan

[73] Assignee: Hitachi, Ltd., Tokyo, Japan

[21] Appl. No.: 243,902

[22] Filed: May 17, 1994

[30] Foreign Application Priority Data

May 20, 1993 [JP] Japan .................................. 5-118137

[51] Int. Cl.⁶ .................................................. H04L 1/22
[52] U.S. Cl. ........................ 370/16; 340/825.16; 395/181; 395/185.01
[58] Field of Search ................................ 370/13, 16, 14; 371/8.2, 11.2; 340/825.06, 825.12, 825.13, 825.16

[56] References Cited

U.S. PATENT DOCUMENTS 5,010,550 4/1991 Hirata ........................................ 371/8.2
5,193,086 3/1993 Satomi et al. ............................. 370/16
5,210,740 5/1993 Anzai et al. .............................. 370/16

*Primary Examiner*—Douglas W. Olms
*Assistant Examiner*—Russell W. Blum
*Attorney, Agent, or Firm*—Antonelli, Terry, Stout & Kraus

[57] ABSTRACT

A line switching apparatus for switching from a telecommunication line to a backup line in the event of occurrence of a fault on the telecommunication line includes a memory storing time zone information for monitoring the state of the telecommunication line, so that, when occurrence of a fault is detected during this monitoring time zone, the line switching apparatus switches from the faulty telecommunication line to a backup line, while when the time is outside the monitoring time zone, the state of the telecommunication line is not monitored so as to prevent unnecessary switching from the telecommunication line to the backup line.

5 Claims, 5 Drawing Sheets

FIG. 4A

TABLE 113A

SETTING OF MONITOR TIME IN ORDINARY DAYS

| MONITOR TIME ZONE | DAY OF WEEK | Sun. | Mon. | Tue. | Wed. | Thur. | Fri. | Sat. |
|---|---|---|---|---|---|---|---|---|
| | MONITOR START | 10:00 | 9:00 | 9:00 | 9:00 | 9:00 | 9:00 | 9:00 |
| | MONITOR END | 15:00 | 19:00 | 19:00 | 19:00 | 19:00 | 19:00 | 17:00 |

FIG. 4B

TABLE 113B

SETTING OF MONITOR TIME IN SPECIAL DAY

| DATE | | MONITOR TIME ZONE 600 | |
|---|---|---|---|
| YEAR, A.D. | MONTH, DAY | MONITOR START | MONITOR END |
| 1993 | MARCH 12 | 9:00 | 12:00 |
| 1993 | APRIL 10 | 8:00 | 10:00 |
| 1993 | MAY 12 | — | — |
| ... | ... | ... | ... |

METHOD AND APPARATUS FOR LINE SWITCHING

BACKGROUND OF THE INVENTION

The present invention relates to a method and apparatus for switching from a telecommunication line to a backup line in a telecommunication network system when a fault occurs on the telecommunication line, and more particularly to a method and apparatus of the kind described above in which a monitor time zone for monitoring the telecommunication line can be set by the line switching apparatus or a network control center in accordance with the service time of the network system, and the time of switching from the telecommunication line to the backup line is determined in accordance with the monitor time zone so set.

With the progress of telecommunication network technology, a telecommunication network system interconnecting computers located at distant places by a telecommunication line for the purpose of information processing is now widely used in this field. In such a network system, the reliability of the network is a matter of great importance, and various measures, including duplexing of the telecommunication line and associated equipment, are usually taken. For example, in a line switching method disclosed in JP-A-2-60337 by the present assignee, duplex telecommunication lines, that is, a usual telecommunication line and a backup line are provided, and, in the event of occurrence of a fault on the telecommunication line now in use, the telecommunication line is switched to the backup line by a line switching apparatus so as to ensure the reliability of the network. Further, in the prior art method, a network control center is connected to a plurality of line switching apparatuses located at different places for the purpose of centralized control of the line switching apparatuses so as to attain unitary line switching control from the network control center located at the remote place. In this case, a public switching network, such as an ISDN, is most frequently used as the backup line.

Suppose now that the prior art line switching method is used in a telecommunication network system in which a plurality of nodes are connected through line switching apparatuses to a telecommunication line and a backup line, and the service time of the network system is primarily determined. In the event of occurrence of a fault on the telecommunication line or shutdown of one of the nodes (due to node plan halt, fault occurrence, etc.) at a time other than the service time of the network system, the network control center instructs the associated one of the line switching apparatuses to switch from the faulty telecommunication line to the backup line, because the prior art line switching apparatus is always monitoring the telecommunication line. Consequently, the backup line that is the public switching network is used for telecommunication in a time zone other than the service time of the network system, thereby accruing an unnecessary extra cost due to the use of the telecommunication line in a time zone other than the service time of the network system.

SUMMARY OF THE INVENTION

It is an object of the present invention to avoid an unnecessary use of the telecommunication line in a time zone other than the service time of such a network system.

In the method and apparatus according to the present invention which solves the prior art problem pointed out above, the line switching apparatus is provided with a function of setting the system service time (the line monitor time) and determining the corresponding time of switching to a backup line, so that the telecommunication line is not monitored in a time zone other than the system service time, thereby preventing unnecessary switching from the telecommunication line to the backup line in that time zone.

Thus, according to the present invention, the telecommunication line can be monitored in the time zone corresponding to the system service time, and the prior art necessity for switching from the telecommunication line to the backup line (the public switching network) due to occurrence of a fault or node shutdown (due to node plan halt, fault occurrence, etc.) in a time zone other than the system service time can be prevented, so that an unnecessary extra cost accruing due to the switching from the telecommunication line to the backup line can be minimized.

BRIEF DESCRIPTION OF THE DRAWINGS

FIGS. 4A and 4B show the contents of a table 113 (FIG. 1) and another table 313 (FIG. 5) registering the monitor starting time and the monitor ending time.

DESCRIPTION OF THE PREFERRED EMBODIMENTS

Preferred embodiments of the present invention will now be described by reference to the drawings.

Figure 1:
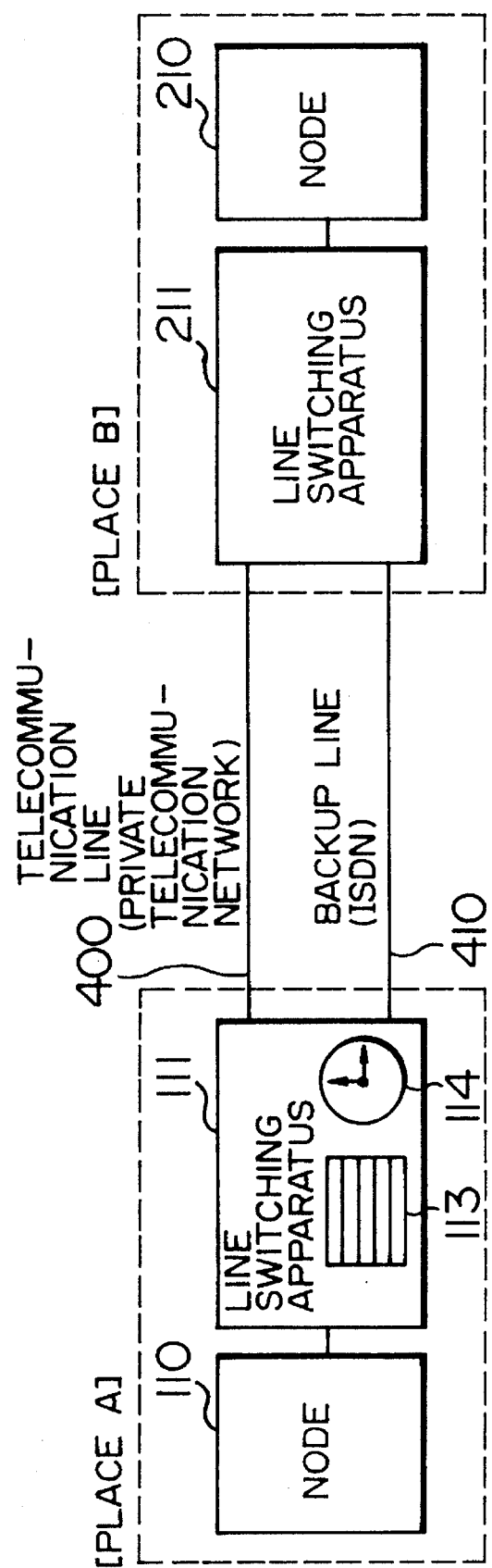
FIG. 1 is a block diagram of a network system showing an embodiment of the present invention.

FIG. 1 is a block diagram of a network system showing an embodiment of the line switching apparatus of the present invention. Referring to FIG. 1, a line switching apparatus 111 embodying the present invention and a node 110 are located at a place A, and another line switching apparatus 211 and another node 210 are located at another place B distant from the place A. The nodes 110 and 210 are connected to a telecommunication line 400 and also to a backup line 410 through the line switching apparatuses 111 and 211. The nodes 110 and 210 may be apparatuses forming a network, such as, host computers, distributed processors, computers at terminals, packet switching units, line changeover units or line multiplexing units. The line switching apparatuses 111 and 211 may be built together with the nodes 110 and 210 in the same housings respectively. The telecommunication line 400 may be a network, such as, an ISDN a subscriber telephone network, a DDX-C or a private telecommunication network. The backup line 410 may be a network, such as an ISDN, a subscriber telephone network or a DDX-C charged on the basis of the time of use. A table 113 registering the monitor starting time and the monitor ending time is built in the line switching apparatus 111. A clock 114 is also built in the line switching apparatus 111.

FIGS. 4A and 4B show the contents of the table 113. The table 113 consists of subtables 113A and 113B. The subtable 113A shown in FIG. 4A is of the type which is classified by the days (Sunday to Saturday) of the week, and in which the monitor time zone can be set for each day of the week. The subtable 113B shown in FIG. 4B is of the type which specifies the monitor time zone for each of special days (such as, national holidays, usual holidays and node plan halt days). The subtable 113B is provided so that, when the service time zone of the network system must be changed for such a special day, the monitor time zone can also be changed by specifying the date. (the month and the day according to the Christian Era) of the special day and by setting the monitor starting time and the monitor ending time. When the network system is not run for service throughout the day, neither the monitor starting time nor the monitor ending time are set as indicated by the numerals 600 in the subtable 113B. The line switching apparatus 111 having these functions continuously monitors the state of the telecommunication line 400 for the specified monitor time zone (the time from the monitor starting time to the monitor ending time) and functions to automatically switch from the telecommunication line 400 to the backup line 410 in the event of occurrence of a fault on the telecommunication line 400.

The operation of the embodiment of the present invention will now be described by reference to FIGS. 2 to 5 in the case where an ISDN is utilized as the backup line 410, a private telecommunication network is utilized as the telecommunication line 400, and the service time of the network system is determined to be between 9:00 and 19:00. The flow chart of FIG. 2 continues through in FIG. 3 as indicated by numerals surrounded by respective circles. The scale and arrangement of the network system are optional.

Figure 2:
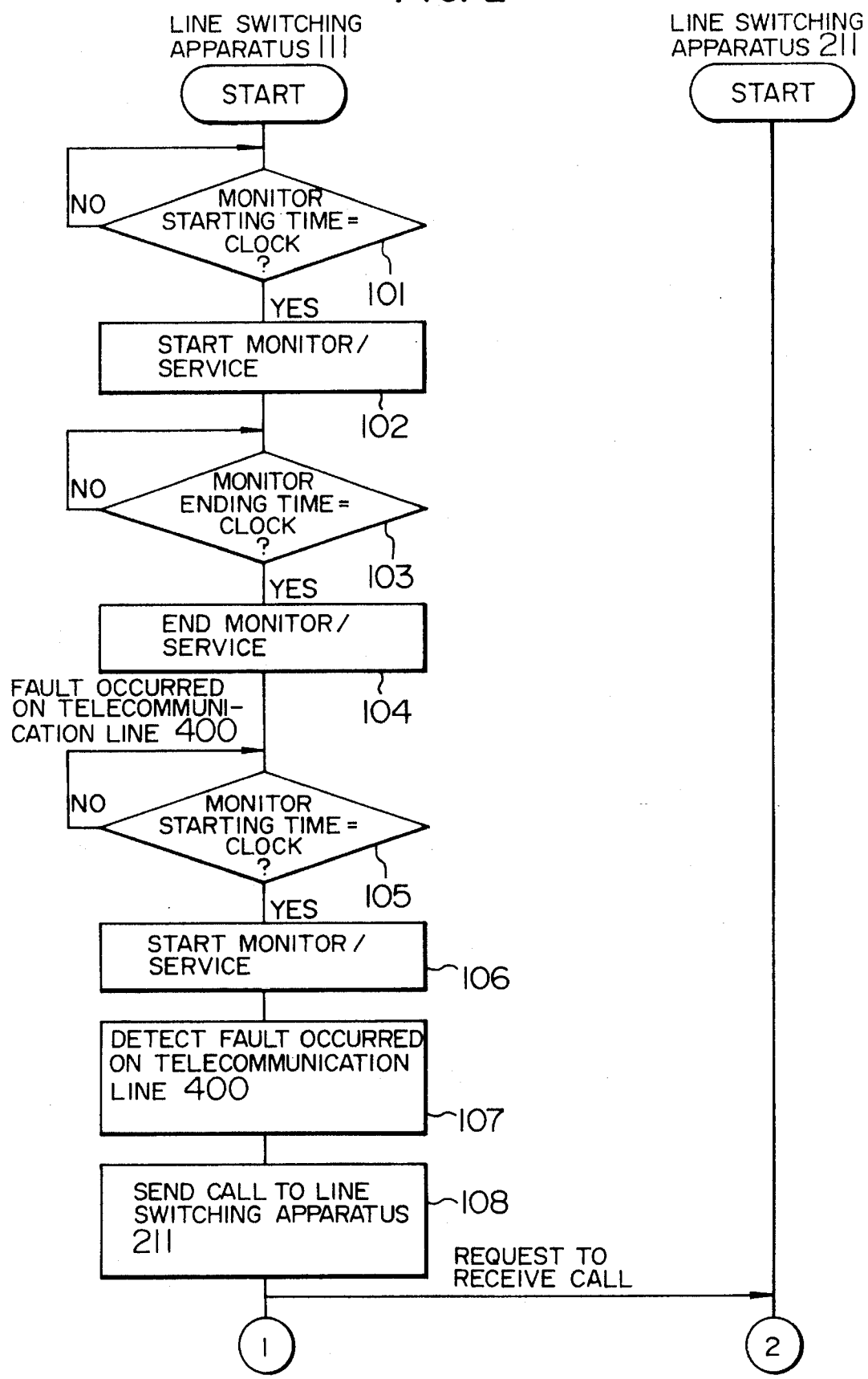
FIG. 2 is a flow chart showing an initial part of the operation of the line switching apparatuses shown in FIG. 1.
Figure 3:
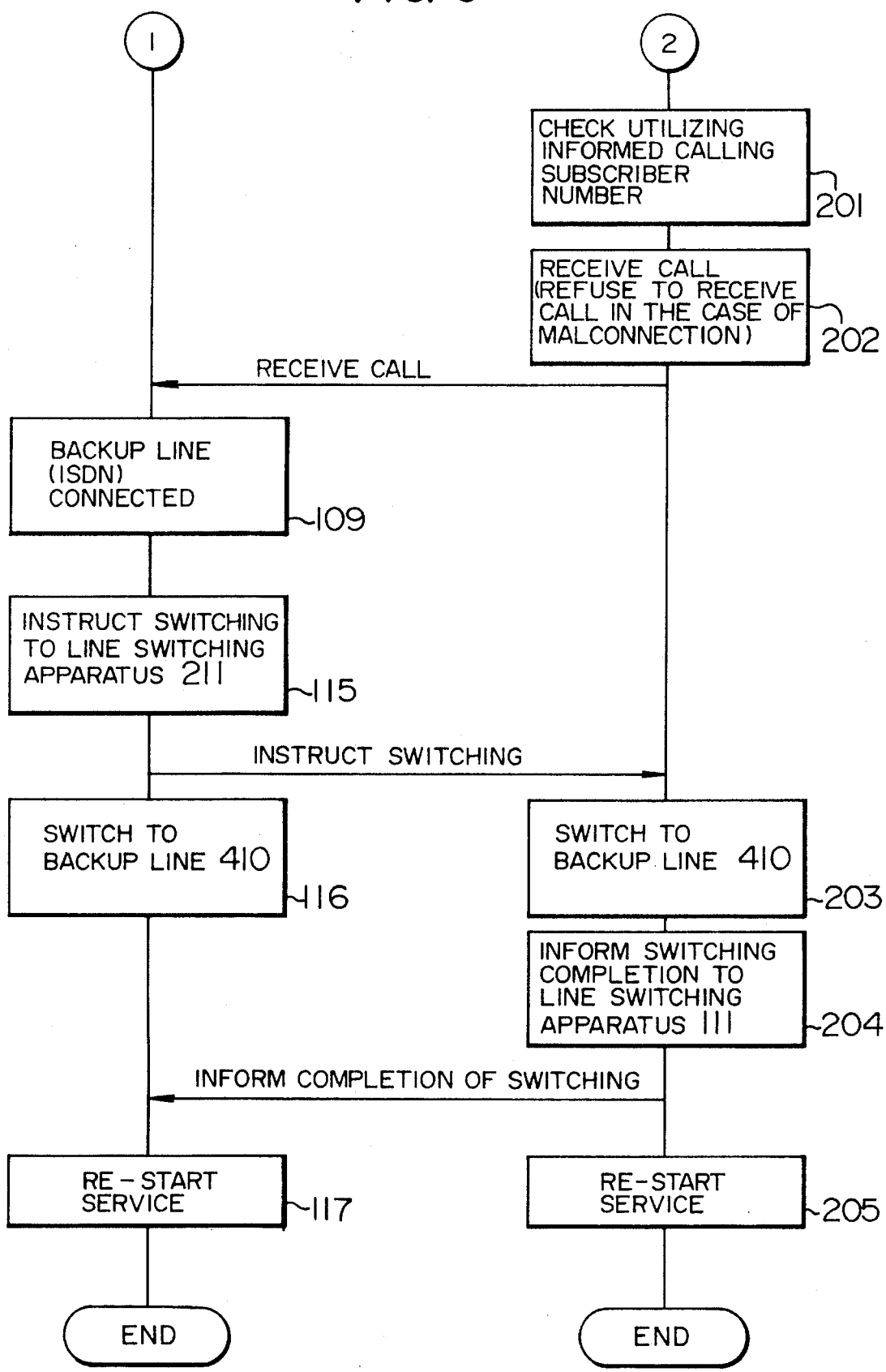
FIG. 3 is a flow chart forming a continuation of FIG. 2 to show the remaining portion of the operation of the line switching apparatuses.

FIGS. 2 and 3 show the operation of the line switching apparatuses 111 and 211 when a fault occurs on the telecommunication line 400 at a time (21:00) other than the system service time, and that such a faulty state continues until the next system service time (9:00) is reached.

Referring back to FIG. 2, a decision is made in a step 101 as to whether or not the monitor starting time of the line switching apparatus 111 (which time coincides with the service starting time of the network system and which is 9:00 herein) coincides with the time indicated on the clock 114 built in the line switching apparatus 111. When the result of decision in the step 101 is YES, the line switching apparatus 111 starts in a step 102 to monitor the telecommunication line 400.

A decision is then made in a step 103 as to whether or not the monitor ending time of the line switching apparatus 111 coincides with the time (19:00) indicated on the clock 114 built in the line switching apparatus 111. When the result of decision in the step 103 is YES, monitoring of the telecommunication line 400 is ended in a step 104.

A fault occurs on the telecommunication line 400 at the time 21:00 as described already. However, the line switching apparatus 111 does not operate because the telecommunication line 400 is not monitored by the line switching apparatus 111 at this time 21:00.

In a step 105, decision is made as to whether or not the monitor starting time of the line switching apparatus 111 coincides with the time (9:00) indicated on the clock 114 built in the line switching apparatus 111. When the result of decision in the step 105 is YES, the line switching apparatus 111 starts to monitor the telecommunication line 400 in a step 106. As soon as the monitoring is started, the line switching apparatus 111 automatically detects in a step 107 that a fault has occurred already on the telecommunication line 400.

In a step 108, the line switching apparatus 111 which has detected the fault automatically originates a call and requests the line switching apparatus 211 to receive that call. As soon as the line switching apparatus 211 receives this call from the line switching apparatus 111, the line switching apparatus 211, utilizing the information regarding the number of the calling subscriber in order to prevent a malconnection, checks in a step 201 to confirm as to whether or not the number of the specific calling subscriber (the number of the calling subscriber which has originated the call transmitted through the line switching apparatus 111 herein) is already registered in the line switching apparatus 211. When the line switching apparatus 211 confirms the number of the calling subscriber, reception of the call is permitted and, in a step 202, sends out response information to the line switching apparatus 111 to indicate the reception of the call. On the other hand, when the number of the calling subscriber is not confirmed, the line switching apparatus 211 refuses the reception of the call and cuts off transmission through the telecommunication line 400. In the embodiment described above, the information regarding the number of the calling subscriber is utilized to prevent the malconnection. However, the subaddress, user-user information, etc. may also be utilized for this purpose.

In a step 109, the line switching apparatus 111 sets up the backup line 410 between it and the line switching apparatus 211. Then, in a step 115, the line switching apparatus 111 sends out the switching command to the line switching apparatus 211, and, in a step 116, the line switching apparatus 111 acts to switch from the telecommunication line 400 to the backup line 410. In the embodiment described above, the line switching apparatus 111 sends out the switching command. However, any one of the line switching apparatuses 111 and 211 may send out the line switching command to make the switching operation.

In a step 203, the line switching apparatus 11 makes the switching operation as soon as it receives the line switching command from the line switching apparatus 111. In a step 204 following the step 203, the line switching apparatus 211 informs the line switching apparatus 111 that the line switching operation has been completed. After the step 204, the service of the network system is re-started in steps 117 and 205.

In the embodiment described above, the line switching apparatus 111 is used to detect a fault which has occurred on the telecommunication line 400. However, the other line switching apparatus 211 may also detect a fault which has occurred on the telecommunication line 400 and send out the switching command without giving rise to any practical problem. In such a case, the clock 114 and the table 113 are to be built in the line switching apparatus 211, and the line switching apparatus 211 generates the monitor starting and ending commands and the command for switching from the telecommunication line 400 to the backup line 410.

Figure 5:
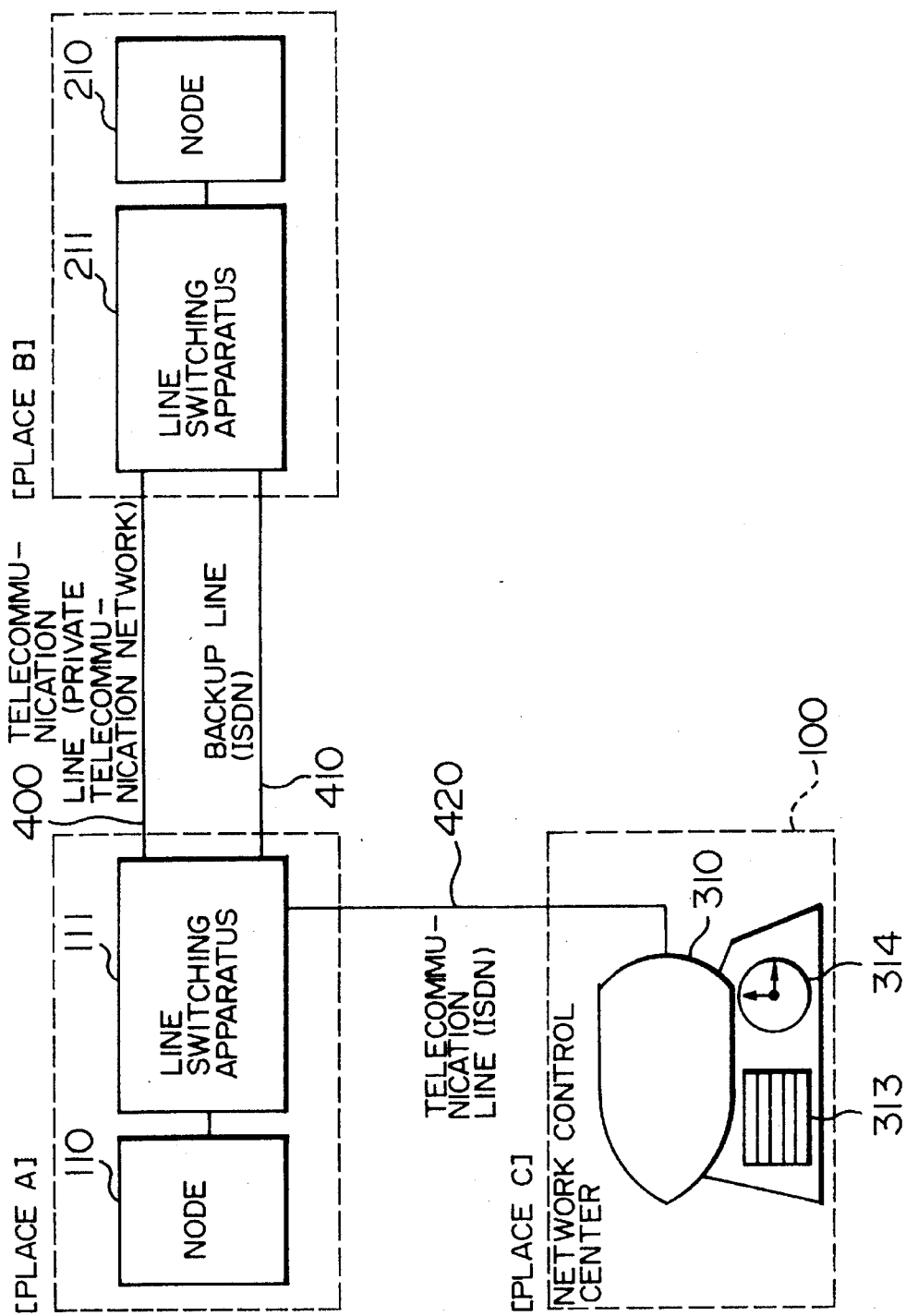
FIG. 5 is a block diagram of another network system showing another embodiment of the present invention.

FIG. 5 shows a modification of the network system shown in FIG. 1. Referring to FIG. 5, the line switching apparatus 111 and the node 110 are located at the place A, while the line switching apparatus 211 and the node 210 are located at the place B distant from the place A. The nodes 110 and 210 are connected to the telecommunication line 400 through the line switching apparatuses 111 and 211 respectively and are also connected by the backup line 410. The nodes 110 and 210 may be apparatuses forming a network, such as host computers, distributed processors, computers at terminals, packet switching units, line change-over units, or line multiplexing units. A network control center 100 is located at a place C distant from the places A and B, and a network control apparatus 310 is disposed in the network control center 100. The network control apparatus 310 is connected to the line switching apparatus 111 by a telecommunication line 420. The telecommunication line 420 may be an ISDN, a subscriber telephone network, a DDX-C or a private telecommunication network. A table 313 registering the monitor starting time and the monitor ending time and a clock 314 are built in the network control apparatus 310. The contents of the table 313 are similar to those of the table 113.

In the case of the network system shown in FIG. 5, the monitor starting time (and the monitor ending time) are registered in the table 313 built in the network control apparatus 310. Therefore, in the illustrated network system, the network control apparatus 310 sends out the monitor starting command and the monitor ending command. That is, steps 101, 103 and 105 are executed under control of the network control apparatus 310, and, in steps 102, 104 and 106, the line switching apparatus 111 is informed of the results of decision in the respective steps 101, 103 and 105. Steps 107 to 117 and steps 201 to 205 are the same as those shown in FIGS. 2 and 3.

It will be understood from the foregoing description that, according to the present invention, the time zone for monitoring the telecommunication line can be set in a relation corresponding to the service time of the network system, so that the prior art unnecessary switching from the telecommunication line to the backup line in the time zone other than a system service time can be avoided. Thus, the charging of an unnecessary fee due to the switching from the telecommunication line to the backup line in a time zone other than the system service time can be prevented.

We claim:

1. A line switching apparatus connected to a telecommunication line and a backup line to monitor the state of said telecommunication line so as to switch from said telecommunication line to said backup line upon occurrence of a fault on said telecommunication line, said line switching apparatus comprising memory means for storing data indicating a service time zone representing a service time of said telecommunication line, and control means for controlling the monitoring operation so as to start to monitor said telecommunication line as soon as the starting time of said service time zone is reached and to end any monitoring of said telecommunication line as soon as the ending time of said service time zone is reached.

2. A line switching apparatus according to claim 1, wherein said backup line is an ISDN.

3. A line switching apparatus according to claim 1, wherein said line switching apparatus is built together with an apparatus selected from the group consisting of an electronic computer, a packet switching apparatus, a line change-over apparatus and a line multiplexing apparatus in the same housing.

4. A line switching method for switching from a telecommunication line to a backup line upon occurrence of a fault on said telecommunication line, said method comprising the steps of:

storing, in a memory means, data of a service time zone representing a service time of said telecommunication line;

starting to monitor the state of said telecommunication line as soon as the starting time of said service time zone is reached;

switching from said telecommunication line to said backup line in the event of occurrence of a fault on said telecommunication line only in response to monitoring the state of said telecommunication line during a service time zone; and ending all monitoring of the state of said telecommunication line as soon as the ending time of said service time zone is reached.

5. A network system having a telecommunication line and a backup line connected therein and including a line switching apparatus for monitoring said telecommunication line for a fault thereon and for switching from said telecommunication line to said backup line in the event of occurrence of a fault on said telecommunication line, said network system comprising a network control apparatus including memory means for storing data of a service time zone representing a service time of said telecommunication line and control means for controlling the monitoring of said telecommunication line for a fault thereon by informing said line switching apparatus that the monitoring operation is to be started as soon as the starting time of said service time zone is reached and that the monitoring operation is to be ended as soon as the ending time of said service time zone is reached, whereby said line switching apparatus starts the monitoring of the state of said telecommunication line when informed from said network control apparatus to start said monitoring operation and ends the monitoring of the state of said telecommunication line when informed from said network control apparatus to end said monitoring apparatus.

\* \* \* \* \*